United States Patent
Ishibashi

(10) Patent No.: US 9,710,405 B2
(45) Date of Patent: Jul. 18, 2017

(54) INFORMATION PROCESSING APPARATUS, INFORMATION PROCESSING SYSTEM, AND NON-TRANSITORY COMPUTER READABLE MEDIUM TO SHARE RESTRICTION INFORMATION WITH OTHER INFORMATION PROCESSING APPARATUS

(71) Applicant: FUJI XEROX CO., LTD., Tokyo (JP)

(72) Inventor: Yasuto Ishibashi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 1 day.

(21) Appl. No.: 14/808,024

(22) Filed: Jul. 24, 2015

(65) Prior Publication Data

US 2016/0283403 A1    Sep. 29, 2016

(30) Foreign Application Priority Data

Mar. 26, 2015  (JP) ................................. 2015-064307

(51) Int. Cl.
*G06F 12/00* (2006.01)
*G06F 13/00* (2006.01)
(Continued)

(52) U.S. Cl.
CPC ........ *G06F 12/145* (2013.01); *G06F 21/6218* (2013.01); *G06F 2212/1052* (2013.01)

(58) Field of Classification Search
CPC .... G06F 13/1663; G06F 15/167; G06F 12/14; G06F 12/1416
(Continued)

(56) References Cited

U.S. PATENT DOCUMENTS 7,730,258 B1 * 6/2010 Smith ................... G06F 3/0622
  711/114
8,351,058 B2    1/2013 Igarashi
(Continued)

FOREIGN PATENT DOCUMENTS

JP    2008-143043 A    6/2008

*Primary Examiner* — Sean D Rossiter
(74) *Attorney, Agent, or Firm* — Sughrue Mion, PLLC

(57) ABSTRACT

An information processing apparatus includes a memory, a receiving unit, and a notifying unit. The memory is used to store identification information of an information processing apparatus having restriction information. The restriction information indicates restriction imposed on multiple information processing apparatuses including the information processing apparatus including the memory. The receiving unit receives a request for the restriction information from an information processing apparatus different from the information processing apparatus including the memory. When the identification information stored in the memory indicates the information processing including the memory, the notifying unit notifies the restriction information to the information processing apparatus that has transmitted the request. When the identification information indicates an information processing apparatus different from the information processing apparatus including the memory, the notifying unit notifies the identification information to the information processing apparatus that has transmitted the request.

14 Claims, 9 Drawing Sheets

| USER ID | RESTRICTION INFORMATION | | MANAGING APPARATUS ID |
|---|---|---|---|
| | CUMULATIVE AMOUNT | UPPER LIMIT | |
| U1 | 53 | 100 | 1B |
| U2 | 210 | 210 | 1B |
| ⋮ | ⋮ | ⋮ | ⋮ |

(51) Int. Cl.
*G06F 12/14* (2006.01)
*G06F 21/62* (2013.01)

(58) Field of Classification Search
USPC .......... 711/E12.091, E12.093, E12.096, 147, 711/163; 727/27–29; 710/8, 13, 36, 72
See application file for complete search history.

(56) References Cited

U.S. PATENT DOCUMENTS

| | | | | |
|---|---|---|---|---|
| 8,521,977 B2* | 8/2013 | Ueki | .................. | G06F 12/1458 711/163 |
| 2005/0174988 A1* | 8/2005 | Bieber | ................ | G06F 12/1458 370/351 |
| 2012/0272028 A1* | 10/2012 | Fukushima | ........... | H04W 4/008 711/163 |
| 2013/0174224 A1* | 7/2013 | Ueki | .................. | G06F 12/1466 726/4 |

* cited by examiner

| USER ID | RESTRICTION INFORMATION | | MANAGING APPARATUS ID |
|---|---|---|---|
| | CUMULATIVE AMOUNT | UPPER LIMIT | |
| U1 | 53 | 100 | 1B |
| U2 | 210 | 210 | 1B |
| ⋮ | ⋮ | ⋮ | ⋮ |

FIG. 7

| STEP | 1A | | | 1B | | | 1C | | |
|---|---|---|---|---|---|---|---|---|---|
| | RESTRICTION INFORMATION | | MANAGING APPARATUS ID | RESTRICTION INFORMATION | | MANAGING APPARATUS ID | RESTRICTION INFORMATION | | MANAGING APPARATUS ID |
| | CUMULATIVE AMOUNT | UPPER LIMIT | | CUMULATIVE AMOUNT | UPPER LIMIT | | CUMULATIVE AMOUNT | UPPER LIMIT | |
| S101 | 0 | N/A | N/A | 0 | N/A | N/A | 0 | N/A | N/A |
| S103 | 0 | [200] | [1B] | 0 | [200] | [1B] | 0 | [200] | [1B] |
| S109 | 0 | 200 | 1B | 0 | 200 | [1A] | 0 | 200 | 1B |
| S111 | 0 | 200 | [1A] | 0 | 200 | 1A | 0 | 200 | 1B |
| S113 | [40] | 200 | 1A | 0 | 200 | 1A | 0 | 200 | 1B |

FIG. 9

| STEP | 1A | | | 1B | | | 1C | | |
|---|---|---|---|---|---|---|---|---|---|
| | RESTRICTION INFORMATION | | MANAGING APPARATUS ID | RESTRICTION INFORMATION | | MANAGING APPARATUS ID | RESTRICTION INFORMATION | | MANAGING APPARATUS ID |
| | CUMULATIVE AMOUNT | UPPER LIMIT | | CUMULATIVE AMOUNT | UPPER LIMIT | | CUMULATIVE AMOUNT | UPPER LIMIT | |
| S201 | 40 | 200 | 1A | 0 | 200 | 1A | 0 | 200 | 1B |
| S206 | 40 | 200 | 1A | 0 | 200 | [1C] | 0 | 200 | 1B |
| S210 | 40 | 200 | [1C] | 0 | 200 | 1C | 0 | 200 | 1B |
| S212 | 40 | 200 | 1C | 0 | 200 | 1C | [40] | 200 | [1C] |
| S214 | 40 | 200 | 1C | 0 | 200 | 1C | [90] | 200 | 1C |

FIG. 11

| STEP | 1A | | | 1B | | | 1C | | |
|---|---|---|---|---|---|---|---|---|---|
| | RESTRICTION INFORMATION | | MANAGING APPARATUS ID | RESTRICTION INFORMATION | | MANAGING APPARATUS ID | RESTRICTION INFORMATION | | MANAGING APPARATUS ID |
| | CUMULATIVE AMOUNT | UPPER LIMIT | | CUMULATIVE AMOUNT | UPPER LIMIT | | CUMULATIVE AMOUNT | UPPER LIMIT | |
| S301 | 40 | 200 | 1A | 0 | 200 | 1A | 0 | 200 | 1B |
| S309 | 40 | 200 | [1C] | 0 | 200 | 1A | 0 | 200 | 1B |
| S311 | 40 | 200 | 1C | [40] | 200 | [1C] | 0 | 200 | 1B |
| S312 | 40 | 200 | 1C | 40 | 200 | 1C | 40 | 200 | [1C] |
| S314 | 40 | 200 | 1C | 40 | 200 | 1C | [90] | 200 | 1C |

INFORMATION PROCESSING APPARATUS, INFORMATION PROCESSING SYSTEM, AND NON-TRANSITORY COMPUTER READABLE MEDIUM TO SHARE RESTRICTION INFORMATION WITH OTHER INFORMATION PROCESSING APPARATUS

CROSS-REFERENCE TO RELATED APPLICATIONS

This application is based on and claims priority under 35 USC 119 from Japanese Patent Application No. 2015-064307 filed Mar. 26, 2015.

BACKGROUND

Technical Field

The present invention relates to an information processing apparatus, an information processing system, and a non-transitory computer readable medium.

SUMMARY

According to an aspect of the invention, there is provided an information processing apparatus including a memory, a receiving unit, and a notifying unit. The memory stores identification information of an information processing apparatus having restriction information. The restriction information indicates restriction imposed on multiple information processing apparatuses including the information processing apparatus including the memory. The receiving unit receives a request for the restriction information from an information processing apparatus different from the information processing apparatus including the memory. When the identification information stored in the memory indicates the information processing including the memory, the notifying unit notifies the restriction information to the information processing apparatus that has transmitted the request. When the identification information indicates an information processing apparatus different from the information processing apparatus including the memory, the notifying unit notifies the identification information to the information processing apparatus that has transmitted the request.

BRIEF DESCRIPTION OF THE DRAWINGS

Exemplary embodiments of the present invention will be described in detail based on the following figures, wherein:

FIG. 7 is a diagram illustrating change of a restriction information table of each image forming apparatus which is caused in the initial-stage operations;

FIG. 9 is a diagram illustrating change of the restriction information table of each image forming apparatus which is caused in the later-stage operations;

FIG. 11 is a diagram illustrating change of the restriction information table of each image forming apparatus which is caused in the later-stage operations of the modified exemplary embodiment.

DETAILED DESCRIPTION

1. Exemplary Embodiment

1-1. Overall Configuration of Image Forming System (Information Processing System)

Figure 1:
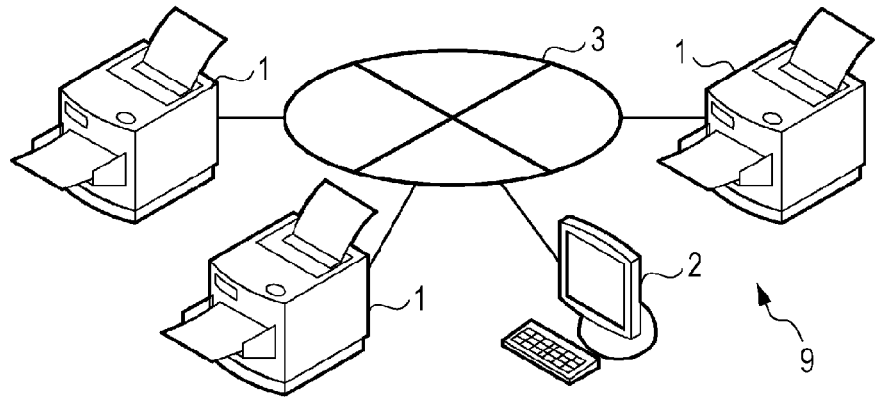
FIG. 1 is a diagram illustrating the overall configuration of an image forming system according to an exemplary embodiment.

FIG. 1 is a diagram illustrating the overall configuration of an image forming system 9 according to an exemplary embodiment. As illustrated in FIG. 1, the image forming system 9 includes multiple image forming apparatuses 1, a terminal 2, and a communication line 3. The image forming system 9 may include multiple terminals 2, or does not necessarily include a terminal 2. When no terminals 2 are included, for example, a user may directly operate an image forming apparatus 1, and may instruct the image forming apparatus 1 to perform some processing.

In the image forming system 9, the multiple image forming apparatuses 1 are interchangeable, not hierarchically related. An image forming apparatus 1 may serve as a server apparatus or a client apparatus, and this relationship may be dynamically changed. That is, an image forming apparatus 1 which serves as a server apparatus at a certain time point may serve as a client apparatus as a result of communication, and vice versa. In addition, this relationship may be different depending on the type of restriction information. For example, an image forming apparatus 1 which serves as a server apparatus for sheet restriction may serve as a client apparatus for charge restriction.

1-2. Configuration of Terminal

Figure 2:
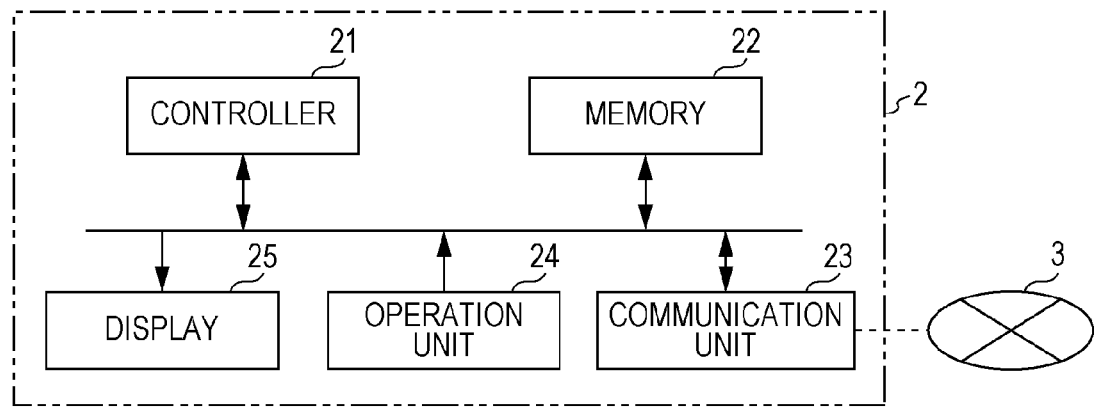
FIG. 2 is a diagram illustrating the configuration of a terminal.

FIG. 2 is a diagram illustrating the configuration of the terminal 2. A controller 21 includes a central processing unit (CPU), a read only memory (ROM), and a random access memory (RAM). The CPU reads computer programs (hereinafter simply referred to as programs) stored in the ROM and a memory 22, and executes the programs, thereby controlling the units of the terminal 2.

The memory 22 which is a mass-storage unit such as a hard disk drive is used to store programs read by the CPU of the controller 21.

A communication unit 23 is an interface communicating information to an image forming apparatus 1 via the communication line 3.

An operation unit 24 provided with operators such as operation buttons for supplying various instructions receives an operation performed by a user and supplies a signal according to the operation to the controller 21.

A display 25 includes a liquid-crystal display, and displays various information or the like specified by the controller 21. The display 25 and the operation unit 24 may constitute a touch panel.

1-3. Configuration of Image Forming Apparatus (Information Processing Apparatus)

Figures 3, 4:
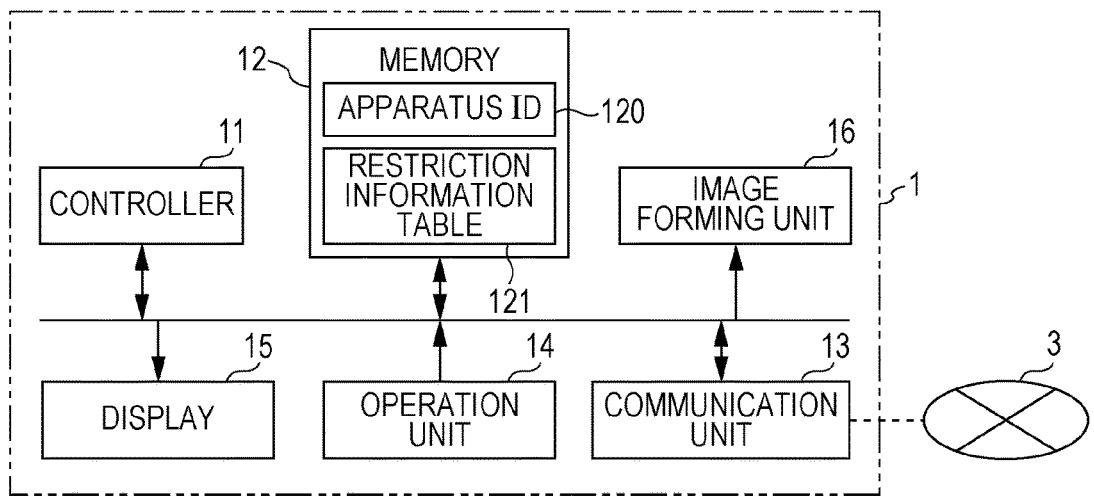
FIG. 3 is a diagram illustrating the configuration of an image forming apparatus.
FIG. 4 is a diagram illustrating an exemplary restriction information table.

FIG. 3 is a diagram illustrating the configuration of an image forming apparatus 1 (which may be hereinafter referred to as an illustrated image forming apparatus 1 to differentiate it from another image forming apparatus 1). A controller 11 includes a CPU, a ROM, and a RAM. The CPU reads programs stored in the ROM and a memory 12, and executes the programs, thereby controlling the units of the image forming apparatus 1.

A communication unit 13 is an interface communicating with other image forming apparatuses 1 and the terminal 2 via the communication line 3.

An operation unit 14 provided with operators such as operation buttons for supplying various instructions receives an operation performed by a user and supplies a signal according to the operation to the controller 11.

A display 15 includes a liquid-crystal display, and displays various information or the like specified by the controller 11. The display 15 and the operation unit 14 may constitute a touch panel.

An image forming unit 16 is a printer, for example, using an electrophotographic system, and forms an image on a medium such as a sheet of paper under the control of the controller 11.

The memory 12 which is a mass-storage unit such as a hard disk drive is used to store programs read by the CPU of the controller 11. The memory 12 is also used to store an apparatus ID 120 which is the identification information of the illustrated image forming apparatus 1, and a restriction information table 121 describing restriction information.

FIG. 4 is a diagram illustrating an exemplary restriction information table 121. The restriction information table 121 describes a user ID, restriction information, and a managing apparatus ID which are associated with one another. The user ID is identification information for identifying each user of the image forming system 9. The restriction information is information indicating restriction imposed when a user uses the multiple image forming apparatuses 1 included in the image forming system 9. The restriction information illustrated in FIG. 4 includes a "cumulative amount" field and an "upper limit" field.

For example, in the restriction information illustrated in FIG. 4, the "restriction" indicates the total of media with which image forming processes may be performed using the multiple image forming apparatuses 1. The "cumulative amount" field illustrated in FIG. 4 describes the cumulative amount of media on which a user of the corresponding user ID has formed images by using the multiple image forming apparatuses 1 from a measurement start date. The "upper limit" field illustrated in FIG. 4 describes the total of media on which the user of the corresponding user ID is permitted to form images by using the multiple image forming apparatuses 1 in a measurement target period.

The "restriction" is not limited to the number of media. As long as the restriction is one imposed when a user uses the above-described image forming apparatuses 1, any restriction may be used. For example, the restriction may be related to the toner amount, the types of sheet, a time zone in which the process is performed, the power use, or the like, or may be related to the amount of payment calculated for execution of image forming processes.

The managing apparatus ID is the identification information of one image forming apparatus 1 which has the latest information about the restriction information associated with the user and which manages the latest information. The restriction information table 121 in which the restriction information and the managing apparatus ID which are associated with each other are stored is an exemplary memory for storing the restriction information and the identification information (managing apparatus ID) of an information processing apparatus (image forming apparatus 1) included in multiple information processing apparatus in such a manner that the restriction information and the identification information are associated with each other. The restriction information indicates restriction imposed on the multiple information processing apparatuses including an information processing apparatus having the memory. In addition, the image forming apparatus 1 indicated by the managing apparatus ID is an information processing apparatus having the restriction information. Therefore, the restriction information table 121 is an exemplary memory for storing the identification information of an information processing apparatus having the restriction information indicating the restriction imposed on the multiple information processing apparatuses including the information processing apparatus having the memory.

In the case illustrated in FIG. 4, the restriction information and the managing apparatus ID are associated with each other for each user in the restriction information table 121. Therefore, in the example illustrated in FIG. 4, the restriction information table 121 is an exemplary memory for storing the restriction information and the managing apparatus ID, which are associated with each other, for each user who uses either of the multiple information processing apparatuses.

The "user" may be a group constituted by people. In this case, each person belonging to one group is identified with the identification information indicating the group. When the person uses the image forming system 9, the same restriction is imposed. A user is not limited to an operator operating the terminal 2 or an image forming apparatus 1. An operator may operate on behalf of the user.

When the restriction information and the managing apparatus ID are not distinctively set for each user, the restriction information table does not need to contain the user ID item. In this case, the same restriction is imposed on all of the users who use the image forming system 9, and the restriction information indicating the restriction is managed by a certain image forming apparatus 1.

1-4. Functional Configuration of Image Forming Apparatus (Information Processing Apparatus)

Figure 5:
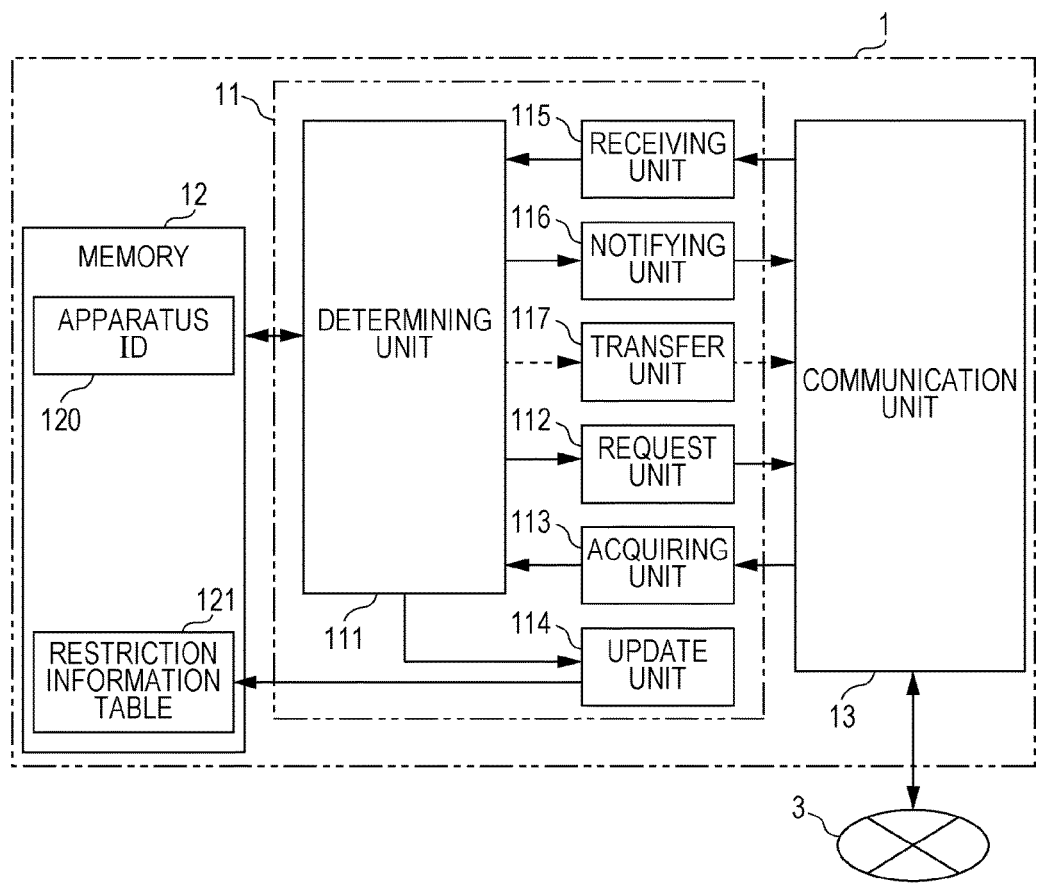
FIG. 5 is a diagram illustrating the functional configuration of an image forming apparatus.

FIG. 5 is a diagram illustrating the functional configuration of an image forming apparatus 1. The controller 11 of the image forming apparatus 1 executes programs stored in the memory 12, thereby functioning as a determining unit 111, a request unit 112, an acquiring unit 113, an update unit 114, a receiving unit 115, and a notifying unit 116.

The receiving unit 115 receives a request for restriction information. In the case of a request for restriction information which is received from the illustrated image forming apparatus 1, the receiving unit 115 receives the request along with a signal (also referred to as an image-forming-instruction signal) to supply an instruction to perform an image forming process, from the terminal 2 via the communication unit 13. In the case of a request for restriction information which is received from a different image forming apparatus 1, the receiving unit 115 receives an image-forming-instruction signal from the different image forming apparatus 1 via the communication unit 13.

The determining unit 111 specifies the user ID of a user who has transmitted the request received by the receiving unit 115, and refers to the restriction information table 121 to specify the managing apparatus ID associated with the user ID. The determining unit 111 compares the specified managing apparatus ID with the apparatus ID 120 to determine whether or not the image forming apparatus 1 indicated by the managing apparatus ID is the illustrated image forming apparatus 1.

The request unit 112 and the acquiring unit 113 are provided with functions implemented when the image forming apparatus 1 functions as a client apparatus requesting restriction information from another image forming apparatus 1.

In the case where the receiving unit 115 receives a request for restriction information from the illustrated image forming apparatus 1 and where the determining unit 111 determines that the managing apparatus ID stored in the restriction information table 121 indicates an image forming apparatus different from the illustrated image forming apparatus 1, the request unit 112 requests the restriction information from the image forming apparatus 1 indicated by the managing apparatus ID.

The acquiring unit 113 acquires information transmitted in response to the request transmitted from the request unit 112.

In the case where the receiving unit 115 receives a request for restriction information from the illustrated image forming apparatus 1 and where the managing apparatus ID stored in the restriction information table 121 indicates the illustrated image forming apparatus 1, the update unit 114 updates the corresponding restriction information stored in the restriction information table 121. In addition, in the case where information acquired by the acquiring unit 113 is restriction information, the update unit 114 updates the restriction information stored in the restriction information table 121 with the acquired restriction information, and updates the managing apparatus ID stored in the restriction information table 121 with the apparatus ID 120.

The notifying unit 116 is provided with a function implemented when the image forming apparatus 1 functions as a server apparatus responding to a request for restriction information which is received from another image forming apparatus 1.

In the case where the receiving unit 115 receives a request for restriction information from a different image forming apparatus 1 and where the managing apparatus ID stored in the restriction information table 121 indicates the illustrated image forming apparatus 1, the notifying unit 116 notifies the different image forming apparatus 1 which has transmitted the request, of the restriction information stored in the restriction information table 121.

In the case where the managing apparatus ID stored in the restriction information table 121 indicates an image forming apparatus different from the illustrated image forming apparatus 1, the notifying unit 116 notifies the image forming apparatus 1 which has requested the restriction information, of the managing apparatus ID stored in the restriction information table 121.

1-5. Operations in Image Forming System (Information Processing System)

The operations performed in the image forming system 9 will be described. The operations performed in the image forming system 9 are classified into operations (initial-stage operations) performed just after the same managing apparatus ID is set at the same time to each of the image forming apparatuses 1 included in the image forming system 9 and operations (later-stage operations) performed in a later state in which different values are set to the managing apparatus IDs in the image forming apparatuses 1.

(1) Initial-Stage Operations

Figure 6:
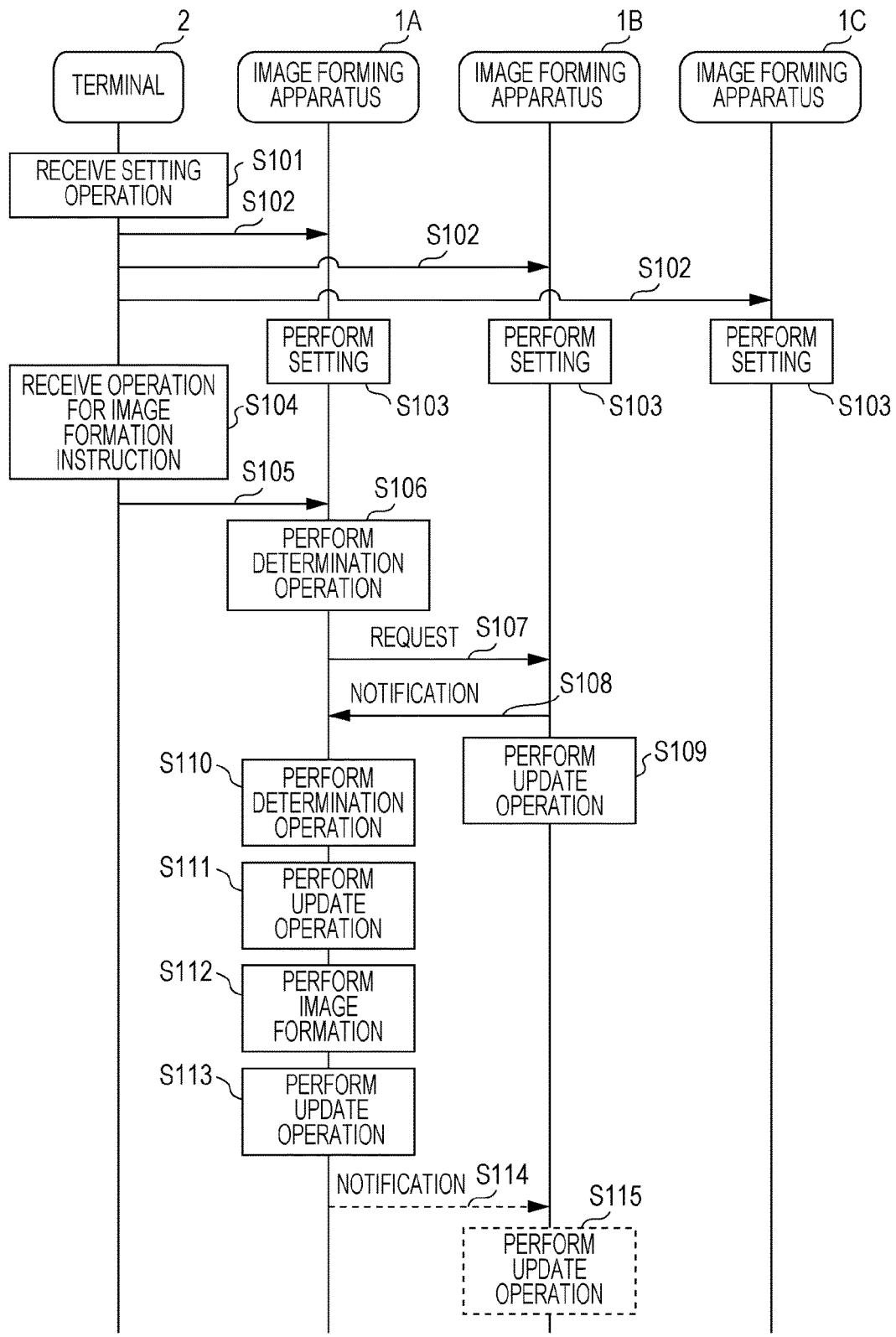
FIG. 6 is a sequence chart for describing initial-stage operations performed in the image forming system.

FIG. 6 is a sequence chart for describing initial-stage operations performed in the image forming system 9. When a user uses the terminal 2 to set, for example, the upper limit "200" and the managing apparatus ID "1B" as restriction information in association with the user ID "U1" which is identification information of the user, the terminal 2 receives the setting operation (step S101), and transmits the information to image forming apparatuses 1A, 1B, and 1C via the communication line 3 (step S102).

FIG. 7 is a diagram illustrating change of the restriction information table 121 of each image forming apparatus 1 which is caused in the initial-stage operations. In the table illustrated in FIG. 7, information of the restriction information table 121 for the image forming apparatuses 1A, 1B, and 1C to which "1A", "1B", and "1C", respectively, are assigned as identification information is illustrated for some steps illustrated in FIG. 6. The information of the restriction information table 121 describes restriction information and managing apparatus ID data which are associated with the user ID "U1".

In step S101, in the restriction information table 121 for the three image forming apparatuses 1, "N/A" which means an unusable value or an undetermined value is stored as the upper limit and the managing apparatus ID in the restriction information for the user ID "U1".

When the image forming apparatuses 1A, 1B, and 1C receive the information about the operation which has been transmitted in step S102, the image forming apparatuses 1A, 1B, and 1C set the restriction information and the managing apparatus ID for the user ID "U1" according to the information (step S103). As a result, as illustrated in FIG. 7, in the restriction information table 121 for the three image forming apparatuses 1, the upper limit "200" and the managing apparatus ID "1B" are stored in association with the user ID "U1".

The user uses the terminal 2 to perform an operation for giving an instruction to perform an image forming process (step S104). At that time, since setting has been made so that information about an operation received on the terminal 2 is transmitted to the image forming apparatus 1A, the instruction to perform an image forming process is transmitted to the image forming apparatus 1A (step S105).

Upon reception of the instruction to perform an image forming process from the terminal 2, the controller 11 of the image forming apparatus 1A determines whether or not the managing apparatus ID stored in association with the user ID indicated by the instruction indicates the image forming apparatus 1A in the restriction information table 121 (step S106). If it is determined that the managing apparatus ID does not indicate the image forming apparatus 1A (that is, indicates an image forming apparatus 1 different from the image forming apparatus 1A), the controller 11 of the image forming apparatus 1A requests restriction information associated with the above-described user ID from the image forming apparatus 1 indicated by the managing apparatus ID (step S107). This request is associated with the identification information of the image forming apparatus 1A.

For example, when the user ID included in the instruction to perform an image forming process which is given by the user is "U1", the controller 11 of the image forming apparatus 1A refers to the restriction information table 121 stored in the memory 12 to specify the managing apparatus ID "1B" corresponding to the user ID. The controller 11 compares the specified managing apparatus ID "1B" with the apparatus ID 120 which is the identification information of the image forming apparatus 1A and which is stored in the memory 12. In this case, since the apparatus ID 120 is "1A", the controller 11 of the image forming apparatus 1A determines that the specified managing apparatus ID "1B" indicates an image forming apparatus 1 other than the image forming apparatus 1A, and requests restriction information from the image forming apparatus 1B indicated by the managing apparatus ID "1B".

The controller 11 of the image forming apparatus 1B which has received the request for restriction information from the image forming apparatus 1A determines whether or not the managing apparatus ID stored in association with the restriction information indicates the image forming apparatus 1B in the restriction information table 121 of the image forming apparatus 1B. If it is determined that the managing apparatus ID indicates the image forming apparatus 1B, the controller 11 reads the requested restriction information from the restriction information table 121 and transmits the restriction information to the image forming apparatus 1A (step S108).

The request for restriction information which is received from the image forming apparatus 1A is associated with "1A" which is the identification information of the image forming apparatus 1A which has transmitted the request. The controller 11 of the image forming apparatus 1B updates the managing apparatus ID in the restriction information table 121 with "1A" which is the identification information of the image forming apparatus 1A which has transmitted the request (step S109). That is, after the controller 11 of the image forming apparatus 1B transmits some notification to the image forming apparatus 1A which has transmitted the request, the controller 11 stores the identification information of the image forming apparatus 1A. As a result, as illustrated in FIG. 7, in the restriction information table 121 of the image forming apparatus 1B, the managing apparatus ID "1A" is stored in association with the user ID "U1".

Upon reception of the notification from the image forming apparatus 1B, the controller 11 of the image forming apparatus 1A determines whether the received notification describes restriction information or a managing apparatus ID (step S110). If it is determined that the received notification describes restriction information, the controller 11 updates the restriction information in the restriction information table 121 with the received restriction information, updates the managing apparatus ID in the restriction information table 121 with the identification information of the image forming apparatus 1A (step S111), and performs the specified image forming process (step S112). As a result, as illustrated in FIG. 7, in the restriction information table 121 of the image forming apparatus 1A, the managing apparatus ID "1A" is stored in association with the user ID "U1". At that time, the restriction information in the restriction information table 121 is also rewritten. Since the values before and after the rewriting are the same, the rewriting operation is not necessarily performed.

The controller 11 of the image forming apparatus 1A updates the restriction information table 121 in accordance with the executed image forming process (step S113). For example, when the image forming apparatus 1A forms images on 40 sheets of paper in the specified image forming process, the controller 11 of the image forming apparatus 1A rewrites the "cumulative amount" field in the corresponding restriction information with "40", and updates the restriction information table 121. As a result, as illustrated in FIG. 7, in the restriction information table 121 of the image forming apparatus 1A, "40" is stored in the "cumulative amount" field of the restriction information in association with the user ID "U1".

Every time an image is formed on each sheet, the controller 11 increments the value described in the "cumulative amount" field by 1, and compares the incremented value with "200" described in the "upper limit" field. When the incremented value does not exceed "200", the process proceeds to the next step. At that time, when the value described in the "cumulative amount" field exceeds the value described in the "upper limit" field until the specified image forming process is completed, the controller 11 may cause the display 15 to display a warning or the like.

(2) Later-Stage Operations

Figure 8:
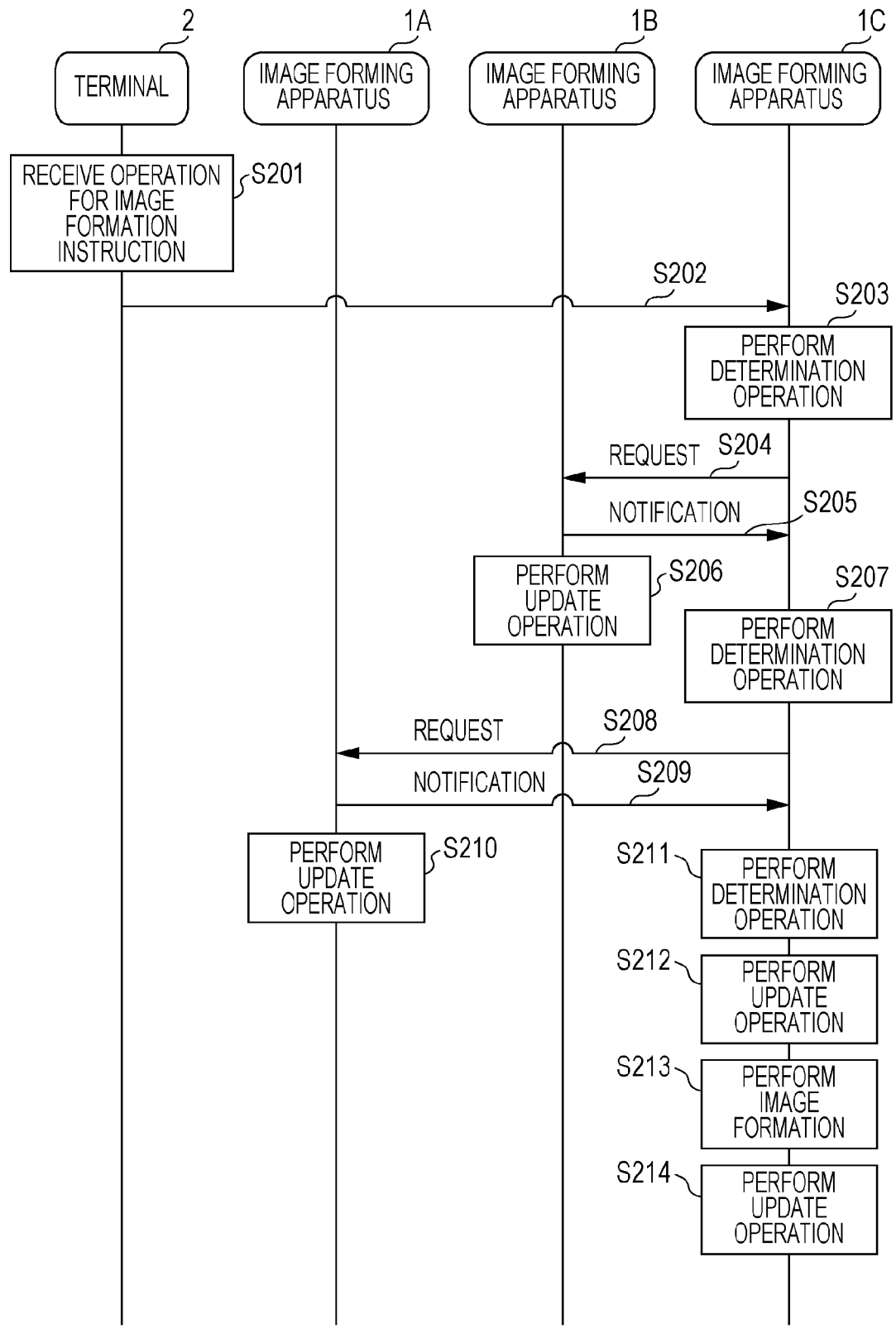
FIG. 8 is a sequence chart for describing later-stage operations performed in the image forming system.

FIG. 8 is a sequence chart for describing the later-stage operations performed in the image forming system 9. FIG. 9 is a diagram illustrating change of the restriction information table 121 of each image forming apparatus 1 which is caused in the later-stage operations.

After completion of the processes illustrated in FIG. 6, the user uses the terminal 2 to perform an operation for giving an instruction to perform an image forming process (step S201). At that time, since setting has been made so that information about an operation received on the terminal 2 is transmitted to the image forming apparatus 1C, the instruction to perform an image forming process is transmitted to the image forming apparatus 1C (step S202).

Upon reception of the instruction to perform an image forming process from the terminal 2, the controller 11 of the image forming apparatus 1C determines whether or not the managing apparatus ID stored in association with the user ID indicated by the instruction indicates the image forming apparatus 1C in the restriction information table 121 (step S203). If it is determined that the managing apparatus ID indicates an image forming apparatus different from the image forming apparatus 1C, the controller 11 of the image forming apparatus 1C requests restriction information associated with the above-described user ID from the image forming apparatus 1 indicated by the managing apparatus ID (step S204).

For example, when the user ID included in the instruction to perform an image forming process which is supplied in step S201 is "U1", the controller 11 of the image forming apparatus 1C refers to the restriction information table 121 stored in the memory 12 to specify the managing apparatus ID "1B" corresponding to the user ID. The controller 11 of the image forming apparatus 1C compares the specified managing apparatus ID "1B" with the apparatus ID 120 which is the identification information of the image forming apparatus 1C and which is stored in the memory 12. In this case, since the apparatus ID 120 is "1C", the controller 11 of the image forming apparatus 1C determines that the specified managing apparatus ID "1B" indicates an image forming apparatus 1 other than the image forming apparatus 1C, and requests restriction information from the image forming apparatus 1B indicated by the managing apparatus ID "1B".

The controller 11 of the image forming apparatus 1B which has received the request for restriction information from the image forming apparatus 1C determines whether or not the managing apparatus ID stored in association with the restriction information indicates the image forming apparatus 1B in the restriction information table 121 of the image forming apparatus 1B. If it is determined that the managing apparatus ID indicates an image forming apparatus different from the image forming apparatus 1B, the controller 11 notifies the image forming apparatus 1C of the managing apparatus ID (step S205). The controller 11 of the image forming apparatus 1B updates the managing apparatus ID of the restriction information table 121 with "1C" which is the identification information of the image forming apparatus 1C which has transmitted the request (step S206). As a result, as illustrated in FIG. 9, in the restriction information table 121 of the image forming apparatus 1B, the managing apparatus ID "1C" is stored in association with the user ID "U1".

Upon reception of the notification from the image forming apparatus 1B, the controller 11 of the image forming apparatus 1C determines whether the received notification describes restriction information or a managing apparatus ID (step S207). If it is determined that the received notification describes a managing apparatus ID, the controller 11 of the image forming apparatus 1C requests restriction information again from the image forming apparatus 1 indicated by the managing apparatus ID (step S208). In this case, since the managing apparatus ID transmitted to the image forming apparatus 1C by the image forming apparatus 1B in step S205 is "1A", the image forming apparatus 1C requests restriction information again from the image forming apparatus 1A indicated by "1A".

The controller 11 of the image forming apparatus 1A which has received the request for restriction information from the image forming apparatus 1C determines whether or not the managing apparatus ID stored in association with the restriction information indicates the image forming apparatus 1A in the restriction information table 121 of the image forming apparatus 1A. If it is determined that the managing apparatus ID indicates the image forming apparatus 1A, the controller 11 reads the requested restriction information from the restriction information table 121 and transmits the restriction information to the image forming apparatus 1C (step S209). The controller 11 of the image forming apparatus 1A updates the managing apparatus ID in the restriction information table 121 with "1C" which is the identification information of the image forming apparatus 1C which has transmitted the request (step S210). As a result, as illustrated in FIG. 9, in the restriction information table 121 of the image forming apparatus 1A, the managing apparatus ID "1C" is stored in association with the user ID "U1".

Upon reception of the notification from the image forming apparatus 1A, the controller 11 of the image forming apparatus 1C determines whether the received notification describes restriction information or a managing apparatus ID (step S211). If it is determined that the received notification describes restriction information, the controller 11 updates the restriction information in the restriction information table 121 with the received restriction information, updates the managing apparatus ID in the restriction information table 121 with the identification information of the image forming apparatus 1C (step S212), and performs the specified image forming process (step S213). As a result, as illustrated in FIG. 9, in the restriction information table 121 of the image forming apparatus 1C, the managing apparatus ID "1C" and the "cumulative amount" value "40" are stored in association with the user ID "U1".

The controller 11 of the image forming apparatus 1C updates the restriction information table 121 in accordance with the executed image forming process (step S214). For example, when the image forming apparatus 1C forms images on 50 sheets of paper in the specified image forming process, the controller 11 of the image forming apparatus 1C rewrites the "cumulative amount" field in the corresponding restriction information from "40" to "90" which is obtained by adding "50" to "40", and updates the restriction information table 121. As a result, as illustrated in FIG. 9, in the restriction information table 121 of the image forming apparatus 1C, "90" is stored in the "cumulative amount" field in the restriction information in association with the user ID "U1".

As described above, multiple image forming apparatuses 1 in the image forming system 9 each update the managing apparatus ID described in the restriction information table 121 after receiving a request for restriction information from another image forming apparatus 1, and do not perform broadcast transmission for sharing the updated information among the other image forming apparatuses 1. As a result, compared with a system in which updated information is broadcasted to the other image forming apparatuses, communication load is reduced.

2. Modified Exemplary Embodiment

The exemplary embodiment is described above. The exemplary embodiment may be modified as described below. Modified exemplary embodiments described below may be combined one another.

2-1. First Modified Exemplary Embodiment

The controller 11 may function as a transfer unit 117 illustrated by using dashed lines in FIG. 5. The transfer unit 117 is provided with a function implemented when an image forming apparatus 1 serves as a server apparatus responding to a request for restriction information which is received from another image forming apparatus 1.

In the case where the receiving unit 115 receives a request for restriction information from another image forming apparatus 1 and where the managing apparatus ID stored in the restriction information table 121 indicates an image forming apparatus different from the illustrated image forming apparatus 1, the transfer unit 117 transfers the request for restriction information which has been received by the receiving unit 115, to the image forming apparatus 1 indicated by the managing apparatus ID. In this case, the acquiring unit 113 may acquire information transmitted in response to the request transferred by the transfer unit 117. When the acquiring unit 113 acquires restriction information, the notifying unit 116 may notify the image forming apparatus 1 which has transmitted the request, of the restriction information.

Figure 10:
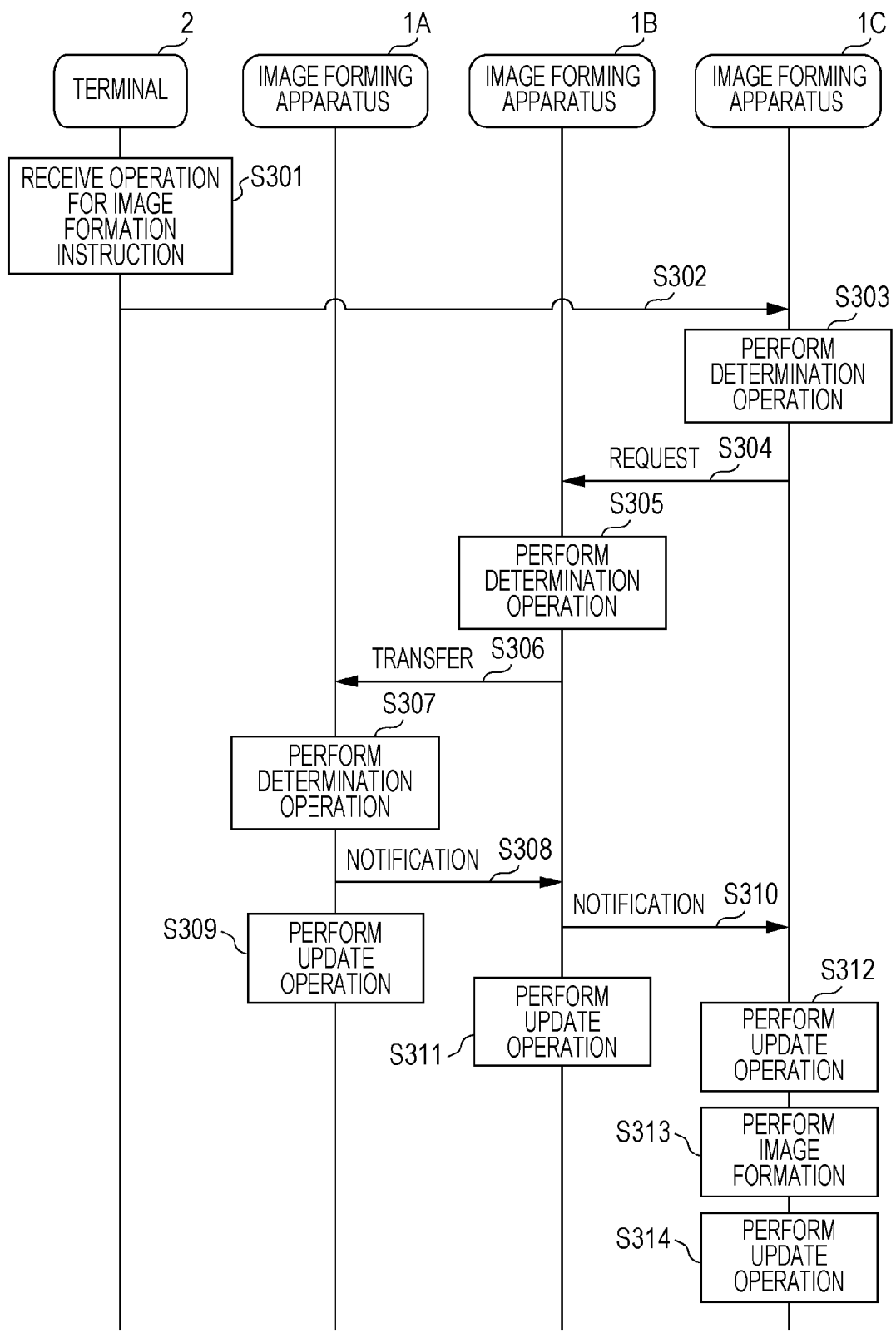
FIG. 10 is a sequence chart for describing later-stage operations performed in an image forming system according to a modified exemplary embodiment.

FIG. 10 is a sequence chart for describing later-stage operations performed in the image forming system 9 according to the first modified exemplary embodiment. FIG. 11 is a diagram illustrating change of the restriction information table 121 of each image forming apparatus 1 which is caused in the later-stage operations according to the first modified exemplary embodiment.

After completion of the processes illustrated in FIG. 6, the user uses the terminal 2 to perform an operation for giving an instruction to perform an image forming process (step S301). At that time, since setting has been made so that information about an operation received on the terminal 2 is transmitted to the image forming apparatus 1C, the instruction to perform an image forming process is transmitted to the image forming apparatus 1C (step S302).

Upon reception of the instruction to perform an image forming process from the terminal 2, the controller 11 of the image forming apparatus 1C determines whether or not the managing apparatus ID stored in association with the user ID indicated by the instruction indicates the image forming apparatus 1C in the restriction information table 121 (step S303). If it is determined that the managing apparatus ID indicates an image forming apparatus different from the image forming apparatus 1C, the controller 11 of the image forming apparatus 1C requests restriction information associated with the above-described user ID from the image forming apparatus 1 indicated by the managing apparatus ID (step S304).

The controller 11 of the image forming apparatus 1B which has received the request for restriction information from the image forming apparatus 1C determines whether or not the managing apparatus ID stored in association with the restriction information indicates the image forming apparatus 1B in the restriction information table 121 of the image forming apparatus 1B (step S305). If it is determined that the stored managing apparatus ID indicates an image forming apparatus different from the image forming apparatus 1B, the controller 11 of the image forming apparatus 1B transfers the request for restriction information which is received in step S304, to the image forming apparatus 1 indicated by the managing apparatus ID (step S306).

In the transfer, the request for restriction information may include the identification information of the image forming apparatus 1 which performs the transfer, or may include the identification information of the image forming apparatus 1 which has transmitted the request first. The image forming apparatus 1 receiving the transferred request receives the identification information of the image forming apparatus 1 which has transmitted the request first, in such a manner that the identification information is associated with the request. In this case, the image forming apparatus 1 which has transmitted the request first is the image forming apparatus 1C. Therefore, the image forming apparatus 1A receives "1C" which is the identification information of the image forming apparatus 1C.

The controller 11 of the image forming apparatus 1A which has received the transferred request for restriction information from the image forming apparatus 1B determines whether or not the managing apparatus ID stored in association with the restriction information indicates the image forming apparatus 1A in the restriction information table 121 of the image forming apparatus 1A (step S307). If it is determined that the stored managing apparatus ID indicates the image forming apparatus 1A, the controller 11 of the image forming apparatus 1A reads the requested restriction information from the restriction information table 121, and transmits the restriction information to the image forming apparatus 1B (step S308).

The controller 11 of the image forming apparatus 1A updates the managing apparatus ID in the restriction information table 121 with "1C" which is the identification information of the image forming apparatus 1C which has transmitted the request (step S309). As a result, as illustrated in FIG. 11, in the restriction information table 121 of the image forming apparatus 1A, the managing apparatus ID "1C" is stored in association with the user ID "U1".

The controller 11 of the image forming apparatus 1B which has obtained the restriction information from the image forming apparatus 1A in step S308 notifies the image forming apparatus 1C which is the request source, of the obtained restriction information (step S310).

The controller 11 of the image forming apparatus 1B updates the restriction information in the restriction information table 121 with the obtained restriction information, and updates the managing apparatus ID in the restriction information table 121 with the identification information "1C" of the image forming apparatus 1C which is the request source (step S311). As a result, as illustrated in FIG. 11, in the restriction information table 121 of the image forming apparatus 1B, the managing apparatus ID "1C" and a "cumulative amount" value "40" in the restriction information are stored in association with the user ID "U1".

The update operation in step S311 may be performed at any time after the transfer operation in step S306. That is, after transfer of the received request, the controller 11 of the image forming apparatus 1 may store the identification information of the image forming apparatus 1 which has transmitted the request, in the restriction information table 121 in the memory 12.

In step S309 described above, the restriction information table 121 is updated by using the identification information of the image forming apparatus 1 which has transmitted the request first. Alternatively, the restriction information table 121 may be updated by using the identification information of the image forming apparatus 1 which has transferred the request. In this case, in the restriction information table 121 of the image forming apparatus 1A, the identification information "1B" of the image forming apparatus 1B which has transferred the request is stored as the managing apparatus ID. Therefore, the managing apparatus ID stored in the image forming apparatus 1A is different from that stored in the image forming apparatus 1B. Accordingly, in this state, when a request for restriction information is input directly to the image forming apparatus 1B, the managing apparatus ID "1C" which is the right information is specified. In contrast, when a request for restriction information is input directly to the image forming apparatus 1A, the managing apparatus ID "1B" which is not right is specified. Even in this case, the request is transferred to the image forming apparatus 1B identified with "1B", and the request is transferred to the image forming apparatus 1C identified with "1C". Although the number of communication operations is increased, the restriction information is finally transmitted to the request source. To reduce the communication load, each image forming apparatus 1 desirably updates the restriction information table 121 by using the identification information of the image forming apparatus 1 which has transmitted the request first.

Upon reception of the notification from the image forming apparatus 1B in step S310, the controller 11 of the image forming apparatus 1C updates restriction information in the restriction information table 121 with the restriction information indicated by the received notification, updates the managing apparatus ID in the restriction information table 121 with the identification information of the image forming apparatus 1C (step S312), and performs the specified image forming process (step S313). As a result, as illustrated in FIG. 11, in the restriction information table 121 of the image forming apparatus 1C, the managing apparatus ID "1C" and the "cumulative amount" value "40" in the restriction information are stored in association with the user ID "U1".

The controller 11 of the image forming apparatus 1C updates the restriction information table 121 according to the executed image forming process (step S314). For example, when the image forming apparatus 1C forms images on 50 sheets of paper in the specified image forming process, the controller 11 of the image forming apparatus 1C rewrites the "cumulative amount" field in the corresponding restriction information from "40" to "90", and updates the restriction information table 121. As a result, as illustrated in FIG. 11, in the restriction information table 121 of the image forming apparatus 1C, "90" is stored in the "cumulative amount" field in the restriction information in association with the user ID "U1".

In this configuration, restriction information, not the identification information of an image forming apparatus 1, is transmitted in response to the request for restriction information. Therefore, information in the notification transmitted in response to the request does not need to be determined.

2-2. Second Modified Exemplary Embodiment

An image forming apparatus 1 which has received the notification in response to a request may transmit a response notification that the notification has been received, to a different image forming apparatus 1 which has transmitted the notification. In this case, after reception of the response notification, the different image forming apparatus 1 which has transmitted the notification may update the managing apparatus ID in the restriction information table 121 with the identification information of the image forming apparatus 1 which has transmitted the response notification.

In this case, for example, as in step S114 illustrated by using a dashed line, after obtaining the requested restriction information, the image forming apparatus 1A which is to perform an image forming process may perform the image forming process and update the restriction information table 121. Then the image forming apparatus 1A may notify the image forming apparatus 1B which has transmitted the restriction information, of information about execution of the image forming process. The image forming apparatus 1B which has received this notification updates the restriction information table 121 with information including the result of the image forming process (step S115).

2-3. Third Modified Exemplary Embodiment

An image forming apparatus 1 includes the image forming unit 16. Alternatively, an image forming apparatus 1 may be connected to an external image forming unit. In this case, the image forming system 9 may include, instead of the image forming apparatuses 1, information processing apparatuses, each of which does not include an image forming unit.

The external apparatus connected to an information processing apparatus is not limited to an image forming unit, and may be any apparatus which performs some processing in accordance with restriction information stored in the restriction information table 121, under the control of the information processing apparatus. That is, the above-described image forming system 9 is an exemplary information processing system including multiple information processing apparatuses, each of which functions as a memory used to store identification information of a first information processing apparatus having restriction information. The restriction information indicates restriction imposed on the information processing apparatuses including the information processing apparatus. When any of the information processing apparatuses is a second information processing apparatus different from the first information processing apparatus, the second information processing apparatus functions as a request unit and an acquiring unit. The request unit requests the restriction information from the first information processing apparatus indicated by the identification information. The acquiring unit acquires information transmitted in response to the request transmitted from the request unit. When any of the information processing apparatuses is the first information processing apparatus, the first information processing apparatus functions as a receiving unit and a notifying unit. The receiving unit receives the request for the restriction information from the second information processing apparatus. When the identification information stored in the memory indicates the first information processing apparatus, the notifying unit notifies the restriction information to the second information processing apparatus that has transmitted the request. When the identification information indicates an information processing apparatus different from the first information processing apparatus, the notifying unit notifies the identification information to the second information processing apparatus that has transmitted the request.

2-4. Fourth Modified Exemplary Embodiment

Programs executed by the controller 11 of an image forming apparatus 1 may be supplied in a state in which the programs are stored in a computer-readable recording medium, such as a magnetic recording medium, for example, a magnetic tape or a magnetic disk, an optical recording medium, for example, an optical disk, a magneto-optical recording medium, or a semiconductor memory. The programs may be downloaded via the Internet or the like. As a controller exemplified by the above-described controller 11, various apparatuses other than a CPU may be employed, and, for example, a dedicated processor may be used.

2-5. Fifth Modified Exemplary Embodiment

In the above-described exemplary embodiment, a user ID, restriction information, and a managing apparatus ID which is the identification information of one image forming apparatus 1 are stored in the restriction information table 121 in such a manner as to be associated with one another. Alternatively, multiple managing apparatus IDs may be stored in the restriction information table 121 in association with a user ID and restriction information. In this case, the multiple image forming apparatuses 1 may manage the latest information about the restriction information associated with the user.

For example, two managing apparatus IDs may be stored in the restriction information table 121 in association with a user ID and restriction information. An example in which the image forming system 9 includes image forming apparatuses 1A, 1B, 1C, and 1D to which identification information "1A", "1B", "1C", and "1D", respectively, are assigned will be described below.

In the image forming apparatus 1A, the restriction information table 121 in which two managing apparatus IDs "1C" and "1D" are written is stored in the memory 12. When the image forming apparatus 1A receives an image-forming-instruction signal from the terminal 2, the image forming apparatus 1A selects one of the two managing apparatus IDs written in the restriction information table 121, and requests restriction information from the image forming apparatus 1 indicated by the managing apparatus ID.

In this example, assume that the image forming apparatus 1A selects "1C". The selection may be performed at random. Instead, for example, one of the two managing apparatus IDs written in the restriction information table 121 may be set as the first ID to be selected first, and the other may be set as the second ID. Alternatively, the selection may be performed in the order in which the symbols for the managing apparatus IDs are written.

The image forming apparatus 1C transmits restriction information to the image forming apparatus 1A, and updates the two managing apparatus IDs in the restriction information table 121 stored in the image forming apparatus 1C, from "1C" and "1D" to "1A" and "1D". Upon reception of the restriction information from the image forming apparatus 1C, the image forming apparatus 1A updates the two managing apparatus IDs in the restriction information table 121 stored in the image forming apparatus 1A, from "1C" and "1D" to "1A" and "1D". The image forming apparatus 1A transmits the restriction information to the image forming apparatus 1D indicated by "1D" which is not the identification information of the image forming apparatus 1A, among the two managing apparatus IDs in the restriction information table 121. Thus, the restriction information is synchronized between the image forming apparatus 1A and the image forming apparatus 1D.

According to this configuration, even when an image forming apparatus 1 selected as a managing apparatus among the multiple image forming apparatuses 1 included in the image forming system 9 fails to respond due to a failure or the like, another managing apparatus may respond on behalf of the selected apparatus, enabling the processes of the entire system to be performed.

2-6. Sixth Modified Exemplary Embodiment

In the above-described exemplary embodiment, when the receiving unit 115 receives a request for restriction information from the illustrated image forming apparatus 1, the receiving unit 115 receives the request along with an image-forming-instruction signal from the terminal 2 via the communication unit 13. Alternatively, an image-forming-instruction signal from a user may be received from the operation unit 14 (see FIG. 3) of an image forming apparatus 1.

For example, when an image forming apparatus 1 includes an image reading unit which reads an image, a user goes to the image forming apparatus 1, places a document to be read, at a reading position of the image reading unit, and operates the operation unit 14 to input an image forming instruction to copy the document. The image forming apparatus 1 receives an image-forming-instruction signal indicating the image forming instruction which has been input, and analyzes the information of the image forming instruction.

When this image forming instruction is, for example, an instruction to read ten sheets of document and to form images in such a manner that each page has two images, the controller 11 of an image forming apparatus 1 specifies that the number of sheets (media) on which images are formed according to the image forming instruction is five. At that time, the controller 11 of the image forming apparatus 1 may specify the user ID of a user who has given the image forming instruction, refer to the restriction information table 121 to specify the managing apparatus ID corresponding to the user ID, and obtain restriction information from the image forming apparatus 1 indicated by the managing apparatus ID. The image forming apparatus 1 which has obtained the restriction information may determine whether or not the process indicated by the above-described image forming instruction is performed under the restriction according to the restriction information, and may determine a process that is to be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A first information processing apparatus comprising:
a memory configured to store identification information and to store restriction information, the identification information identifying one of a plurality of information processing apparatuses including the first information processing apparatus, the restriction information indicating restriction imposed on the plurality of information processing apparatuses; and
at least one hardware processor configured to execute:
receiving a request for the restriction information from a second information processing apparatus of the plurality of information processing apparatuses;
notifying, in response to determining the identification information stored in the memory identifies the first information processing apparatus, the second information processing apparatus of the restriction information;
notifying, in response to determining the identification information identifies a third information processing apparatus of the plurality of information processing apparatuses, to notify the second information processing apparatus of the third information processing apparatus; and
updating, in response to determining which of the plurality of information processing apparatuses is identified by the identification information, the identification information to identify the second information processing apparatus.

2. The information processing apparatus according to claim 1, wherein the at least one hardware processor is further configured to execute:
receiving second identification information of the second information processing apparatus in association with the request, and
wherein the memory is further configured, in response to either notifying the second information processing apparatus of the restriction information or notifying the second information processing apparatus of the third information processing apparatus, to store the second identification information.

3. The information processing apparatus according to claim 2,
wherein the memory is further configured to store a plurality of restriction information, including the restriction information, and a plurality of identification information, including the identification information, for each user of a plurality of users in such a manner that the plurality of restriction information and the plurality of identification information are associated with each other as ones of a plurality of pairs,
wherein the information processing apparatuses are configured to be used by the users.

4. The information processing apparatus according to claim 1,
wherein the memory is further configured to store a plurality of restriction information, including the restriction information, and a plurality of identification information, including the identification information, for each user of a plurality of users in such a manner that the plurality of restriction information and the plurality of identification information are associated with each other as ones of a plurality of pairs, wherein the information processing apparatuses are configured to be used by the users.

5. The information processing apparatus according to claim 1, wherein the restriction information indicates a cumulative amount of a predetermined process performed for a user of the image processing apparatuses.

6. The information processing apparatus according to claim 5, wherein the at least one hardware processor is further configured to execute:

updating the cumulative amount of the predetermined process performed for the user of the image processing apparatuses in response to an indication that any of the image processing apparatuses have performed the predetermined process.

7. The information processing apparatus according to claim 6, wherein the at least one hardware processor is further configured to compare the cumulative amount with a predetermined upper limit of the predetermined process and to restrict further performance of the predetermined process in response to determining that the cumulative amount would exceed the predetermined upper limit by further performance of the predetermined process.

8. A first information processing apparatus comprising:

a memory configured to store identification information and to store restriction information, the identification information identifying one of a plurality of information processing apparatuses including the first information processing apparatus, the restriction information indicating restriction imposed on the plurality of information processing apparatuses; and at least one hardware processor configured to execute:

receiving a request for the restriction information from a second information processing apparatus of the plurality of information processing apparatuses;

notifying, in response to determining the identification information identifies the first information processing apparatus, the second information processing apparatus of the restriction information;

transferring, in response to determining the identification information identifies a third information processing apparatus of the plurality of information processing apparatuses, the request to the third information processing apparatus; and acquiring second restriction information transmitted from the third information processing apparatus in response to the request transferred to the third information processing apparatus;

updating, in response to determining which of the plurality of information processing apparatuses is identified by the identification information, the identification information to identify the second information processing apparatus; and notifying, in response to acquiring the second restriction information, the second information processing apparatus of the second restriction information.

9. The information processing apparatus according to claim 8, wherein the at least one hardware processor is further configured to execute:

receiving second identification information of the second information processing apparatus in association with the request, and wherein, the memory is further configured, in response to either notifying the second information processing apparatus of the restriction information or notifying the second information processing apparatus of the second restriction information, to store the second identification information.

10. The information processing apparatus according to claim 9, wherein the at least one hardware processor is further configured to execute:

receiving, in a case that the request is transferred by the second information processing apparatus from the third information processing apparatus, third identification information identifying the third information processing apparatus.

11. The information processing apparatus according to claim 10, wherein the memory is further configured to store a plurality of restriction information, including the restriction information, and a plurality of identification information, including the identification information, for each user of a plurality of users in such a manner that the plurality of restriction information and the plurality of identification information are associated with each other as ones of a plurality of pairs, wherein the information processing apparatuses are configured to be used by the users.

12. The information processing apparatus according to claim 9, wherein the memory is further configured to store a plurality of restriction information, including the restriction information, and a plurality of identification information, including the identification information, for each user of a plurality of users in such a manner that the plurality of restriction information and the plurality of identification information are associated with each other as ones of a plurality of pairs, wherein the information processing apparatuses are configured to be used by the users.

13. The information processing apparatus according to claim 8, wherein the memory is further configured to store a plurality of restriction information, including the restriction information, and a plurality of identification information, including the identification information, for each user of a plurality of users in such a manner that the plurality of restriction information and the plurality of identification information are associated with each other as ones of a plurality of pairs, wherein the information processing apparatuses are configured to be used by the users.

14. A non-transitory computer readable medium storing a program configured to be implemented by a first information processing apparatus, to execute a process, the first information processing apparatus comprising a memory configured to store identification information and to store restriction information, the identification information identifying one of a plurality of information processing apparatuses including the first information processing apparatus, the restriction information indicating restriction imposed on the plurality of information processing apparatuses, the process comprising:

receiving a request for the restriction information from a second information processing apparatus of the plurality of information processing apparatuses;

in response to determining the identification information stored in the memory identifies the first information processing apparatus, notifying the second information processing apparatus of the restriction information, and, in response to determining the identification information identifies a third information processing apparatus of the plurality of information processing apparatuses, notifying the second information processing apparatus of the third information processing apparatus; and in response to determining which of the plurality of information processing apparatuses is identifies by the identification information, updating the identification information to identify the second information processing apparatus.

* * * * *